United States Patent [19]

Takahashi et al.

[11] Patent Number: 4,996,710

[45] Date of Patent: Feb. 26, 1991

[54] SIDE-TONE ADJUSTING SYSTEM AND METHOD FOR KEY TELEPHONE SYSTEM ESTABLISHING A PLUREL KINDS OF SPEAKING PATHS

[75] Inventors: Toshiaki Takahashi; Yasuji Sato, both of Tokyo, Japan

[73] Assignee: Kabushiki Kaisha Toshiba, Kanagawa, Japan

[21] Appl. No.: 411,378

[22] Filed: Sep. 25, 1989

[30] Foreign Application Priority Data

Sep. 28, 1988 [JP] Japan ................................ 63-243178

[51] Int. Cl.⁵ ...................... H04M 1/00; H04M 1/76; H04M 3/56
[52] U.S. Cl. .................................... 379/202; 379/391; 379/394
[58] Field of Search ............... 379/202, 203, 204, 205, 379/206, 246, 242, 340, 400, 414, 391, 394, 347, 403, 404, 219

[56] References Cited

U.S. PATENT DOCUMENTS 3,083,265  3/1963  Paulaitis et al. ................. 379/404 X
4,887,293  12/1989  Molnay ............................ 379/391 X

*Primary Examiner*—James L. Dwyer
*Attorney, Agent, or Firm*—Banner, Birch, McKie & Beckett

[57] ABSTRACT

The present invention disclose a switching system including an exchange coupled to a plurality of central office lines and PBX's telephone lines, and a plurality of telephone sets. Each telephone set includes a side-tone adjusting circuit which adjusts a side-tone in response to a balanced impedance to obtain a suitable side-tone. When the exchange receives a speaking path selection request, representing one of the lines, from the telephone set, it determines one of a plurality of predetermined impedance information and makes a speaking path between the selected line and the telephone set. The telephone set selects one of the balanced impedances in response to the determined impedance information.

16 Claims, 5 Drawing Sheets

| SELECTION LINE | BALANCED IMPEDANCE |
|---|---|
| C/O 1 | Z2 |
| C/O 2 | Z2 |
| ⋮ | ⋮ |
| C/On | Z1 |
| INT | Z1 |
*Fig.2.*
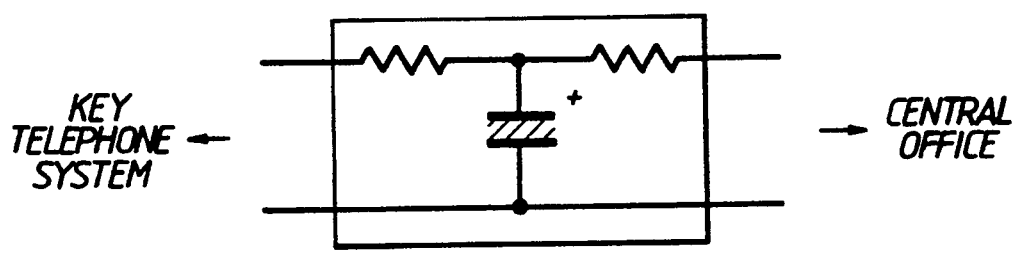
*Fig.3.*
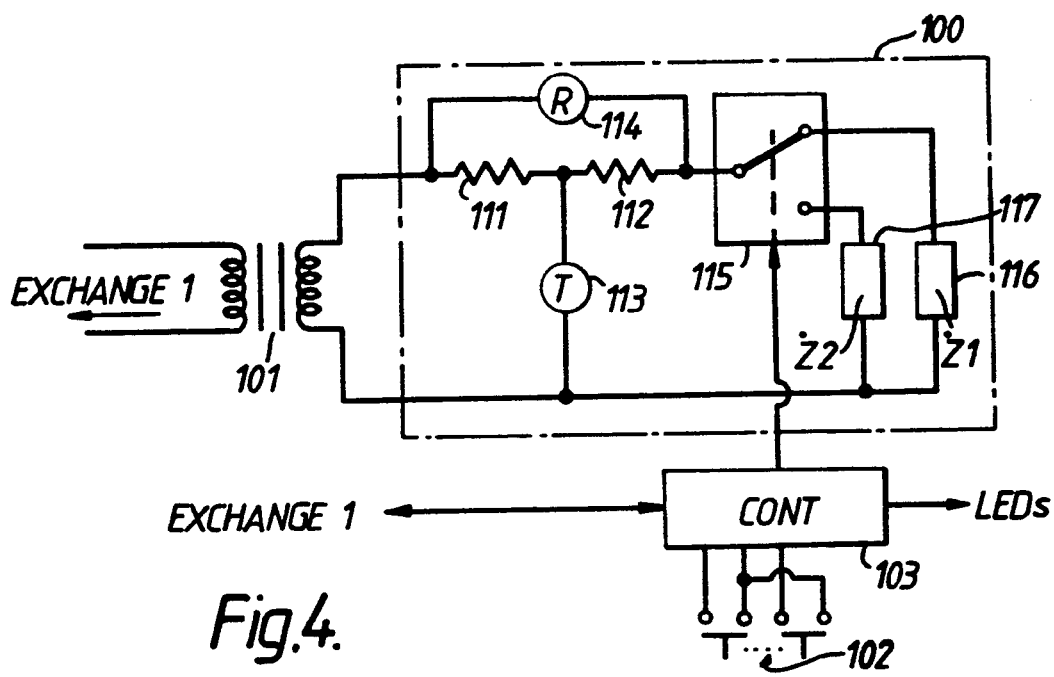
*Fig.4.*

| SELECTION | BALANCED IMPEDANCE |
|---|---|
| C/O 1 | Z2 |
| C/O 2 | Z2 |
| ⋮ | ⋮ |
| C/O n | Z1 |
| INT | Z1 |
| CONF | Z3 |

SIDE-TONE ADJUSTING SYSTEM AND METHOD FOR KEY TELEPHONE SYSTEM ESTABLISHING A PLUREL KINDS OF SPEAKING PATHS

BACKGROUND OF THE INVENTION

1. Field of the Invention

This invention relates to the field of switching system, more particularly relates to side-tone adjusting apparatus and method corresponding to a speaking path selection request.

2. Description of the Prior Art

There has been rapid developments in telephone switching systems in recent years. In general, the exchange of a switching system is coupled to a plurality of extensions comprised of telephone sets and telephone lines. The exchange operates a call sequence by selectively connecting a calling telephone set to a designated called telephone set. The called telephone set responds to the call in order to complete the connection of a speaking path between the telephone sets. The exchange also operates another call sequence by selectively connecting an incoming telephone line to the telephone set that responds to the incoming call. The telephone set responds to the call in order to complete the connection of a speaking path between the incoming telephone line and itself.

Generally, each telephone set has a side-tone adjusting circuit comprised of T-type bridge circuit in order to obtain a suitable side-tone during a speaking. The side-tone adjusting circuit adjusts the side-tone in responsive to a balanced impedance.

In conventional telephone switching system, the balanced impedance is fixed to one predetermined value during a manufacturing. The manufacturer determines the impedance value corresponding to an impedance value of a predetermined standard length of telephone line because a suitable side-tone is obtained by a relationship between the impedance of telephone line and the balanced impedance. Therefore, if the telephone set is connected to the central telephone line extending from a distant central office, the quality of side-tone is debased because the line impedance increases. If the telephone set is connected to the PBX's telephone line extending from a close PBX, the quality of side-tone is also debased because the line impedance decreases. The more a difference between the actual line impedance and the predetermined line impedance increases, the more the quality of side-tone is debased. Thus the present system is inadequate when the system is adapted to connect a plural kinds of telephone lines.

SUMMARY OF THE INVENTION

It is therefore an object of the present invention to provide a side-tone adjusting apparatus and method, for a switching system, capable of corresponding to a plurality of speaking paths having difference line impedances to obtain a suitable side-tone.

It is another object of the present invention to provide a side-tone adjusting apparatus, for a switching system, capable of corresponding to a plurality of speaking paths having difference line impedances with a simple structure to obtain a suitable side-tone.

According to the present invention, and in order to realize the above objects, a switching system is provided which includes an exchange with an exchanging switch coupled to a plurality of telephone lines, such as central office lines and PBX's telephone lines, a plurality of telephone sets coupled to the exchange. The exchange has a memory for storing impedance information for each kind of telephone line respectively. When the telephone set, including manual keys, generates a line selection request in response to the predetermined key operation with the keys. The control circuit in the exchange responds to the request and determines one of the impedance information, corresponding to the requested line, stored in the memory. The control circuit thereafter generates the determined impedance information. The control circuit in the telephone set responds to the determined impedance information and selects one of prepared balanced impedances. The selected balanced impedance corresponds the requested line. The balanced impedance is connected to a side-tone adjusting circuit to obtain a suitable side-tone adapted to the requested line. Thus, the operator hear the suitable side-tone adapted to the requested line.

According to another invention, the memory further stores conference impedance information and the control circuit in the exchange responds to the conference request from the telephone set and determines the conference impedance information stored in the memory. Thereafter, the control circuit in the telephone set responds to the determined impedance information and selects a conference balanced impedance to obtain a suitable side-tone during a conference. Thus, the operator hear the suitable side-tone adapted to the conference.

BRIEF DESCRIPTION OF THE DRAWINGS

The subject matter which is regarded as the invention is particularly pointed out and distinctly claimed in the claims of the specification. The invention, however, both as to organization and method of practice, together with further objects and advantages therof, may be best understood by reference to the following detailed description of the invention taken in conjunction with the drawings in which;

FIG. 2 shows a memory block of a memory device shown in FIG. 1 and the contents of the memory block:

FIG. 3 is a equivalent circuit of a central office line;

FIG. 4 is a block diagram of a telephone set shown in FIG. 1;

DESCRIPTION OF THE PREFERRED EMBODIMENTS

Figure 1:
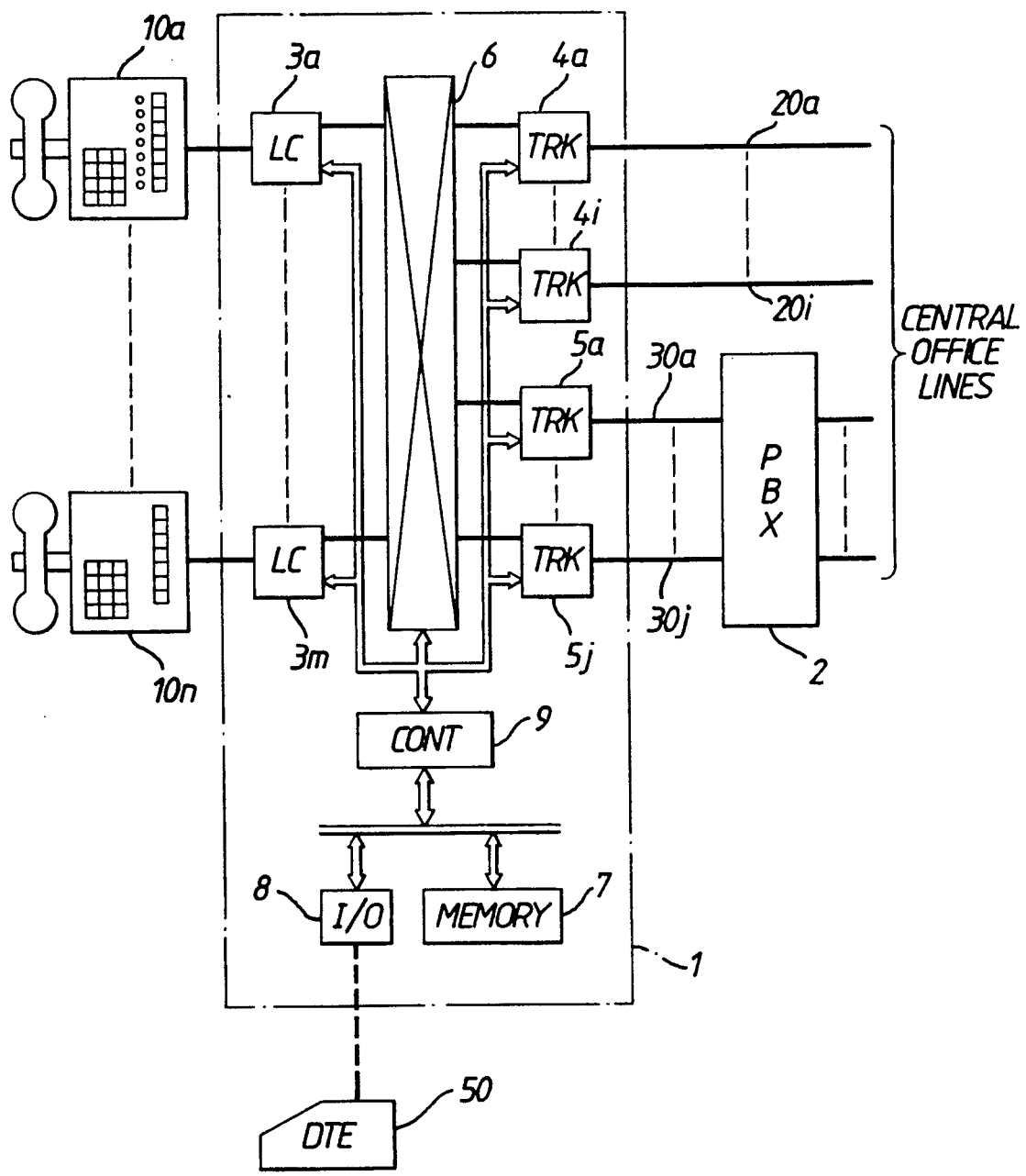
FIG. 1 is a general block diagram illustrating one embodiment of the present invention.

FIG. 1 is an illustration of one embodiment of the present invention showing a key telephone system. Exchange (central unit) 1 is connected EKTs (electronic key telephone sets) $10a$–$10m$, central office lines $20a$–$20i$, PBX's telephone line $30a$–$30j$. Central office lines $20a$–$20i$ are extended from a distant central office and PBX's telephone lines $30a$–$30j$ are extended from close PBX 2 connected to the other central office lines. So, the line impedances of lines $20a$–$20i$ are greater than the line impedances of lines $30a$–$30j$. Exchange 1 includes line circuits $3a$–$3m$ connected to respective EKTs 10a–10m, trunk circuit 4a–4i connected to respective office lines 20a–20i, trunk circuit 5a–5j connected to respective telephone lines 30a–30j, exchanging switch 6, memory device 7, I/O interface 8 and control unit 9.

Each of line circuits 3a–3m transmits analog audio signal between EKTs 10a–10m and exchanging switch 6 and transmits control data regards to calling and called operations. Each of trunk circuit 4a–4i transmits analog audio signal between office lines 20a–20i and exchanging switch 6 and transmits control data between themself and control unit 9. The trunk circuit 4a–4i operate as a detector to detect a ringing signal from the respective office lines 20a–20i. to detect the state of call release (completion of call) of the respective office lines 20a–20i, and operate to send control data representing start (and completion) of a telephone call and to make (or break) the direct current loop of the respective office lines 20a–20i, i.e. Trunk circuits 5a–5j operate substantially the same operations as trunk circuit 4a–4i. Exchanging switch 6 operates to selectively switch its own speaking path in order to selectively connect the EKTs, the office lines and the PBX's lines through the line circuits, the trunk circuits and its own speaking path in any combination designated by control unit 9 in time division or multiplexed fasion. These functions of the line circuits, the trunk circuits and the exchanging switch are well known in the art.

Memory device 7 is connected to control unit 9 through a bus and stores computer programs and data block MB1 as shown in FIG. 2. The data block MB1 stores balanced impedance data corresponding to respective lines including lines 20a–20i and 30a–30j and an internal line (extension). The impedance data Z1 corresponds to lines 30a–30j and an internal line (INT) and the impedance data Z2 corresponds to lines 20a–20i. In general, the key telephone system is installed near PBX 2 but the key telephone system is installed in a point at a long distance, such as a several miles, from the central office exchange. The equivalent circuit of the line is shown in FIG. 3 and is well known in the art. The more the line is longer, the more the impedance of the equivalent circuit increases. So, the impedance value representing the impedance data Z2 is greater than the impedance value representing the impedance data Z1 because the line impedance increases in proportion to the length of telephone line.

I/O (input and output) interface 8 is connected to control unit 9 through the bus to enter operating data, such as the impedance data, into memory device 7 from external data terminal 50 and to output data, such as the operating data, to the terminal 50. The terminal is connected to I/O interface 8 as required. Control unit 9 includes CPU (central processing unit) (not shown) and controls the entire system by excuting several computer programs stored in memory device 7 as described in more detail hereinafter.

Each of EKTs 10a–10m includes side-tone adjusting circuit 100 connected to exchange 1 through transformer 101, manual keys 102 having line selection keys and dial keys, control circuit 103 having CPU and a memory device storing computer programs and operating data. The control circuit 103 sends control data to control unit 9 and receives control data from control unit 9. The control circuit 103 also controls LEDs (not shown) corresponding to the line selection keys respectively. The side-tone adjusting circuit 100 is a T-type bridge circuit and includes resistances 112 and 113, transmitter 113, receiver 114, switch 115 and balanced impedance circuits 116 and 117. Switch 115 selectively connects one of impedance circuits 116 and 117 by the control of control circuit 103. The suitable side-tone is obtained if R111*(selected impedance Z1 or Z2) is close to R112*(actual line impedance) when the resistance value of resistance 111 is R111 and the resistance value of resistance 112 is R112. Each of selected impedance circuits 116 and 117 corresponds to respective impedance information stored in memory device 7.

Figure 5:
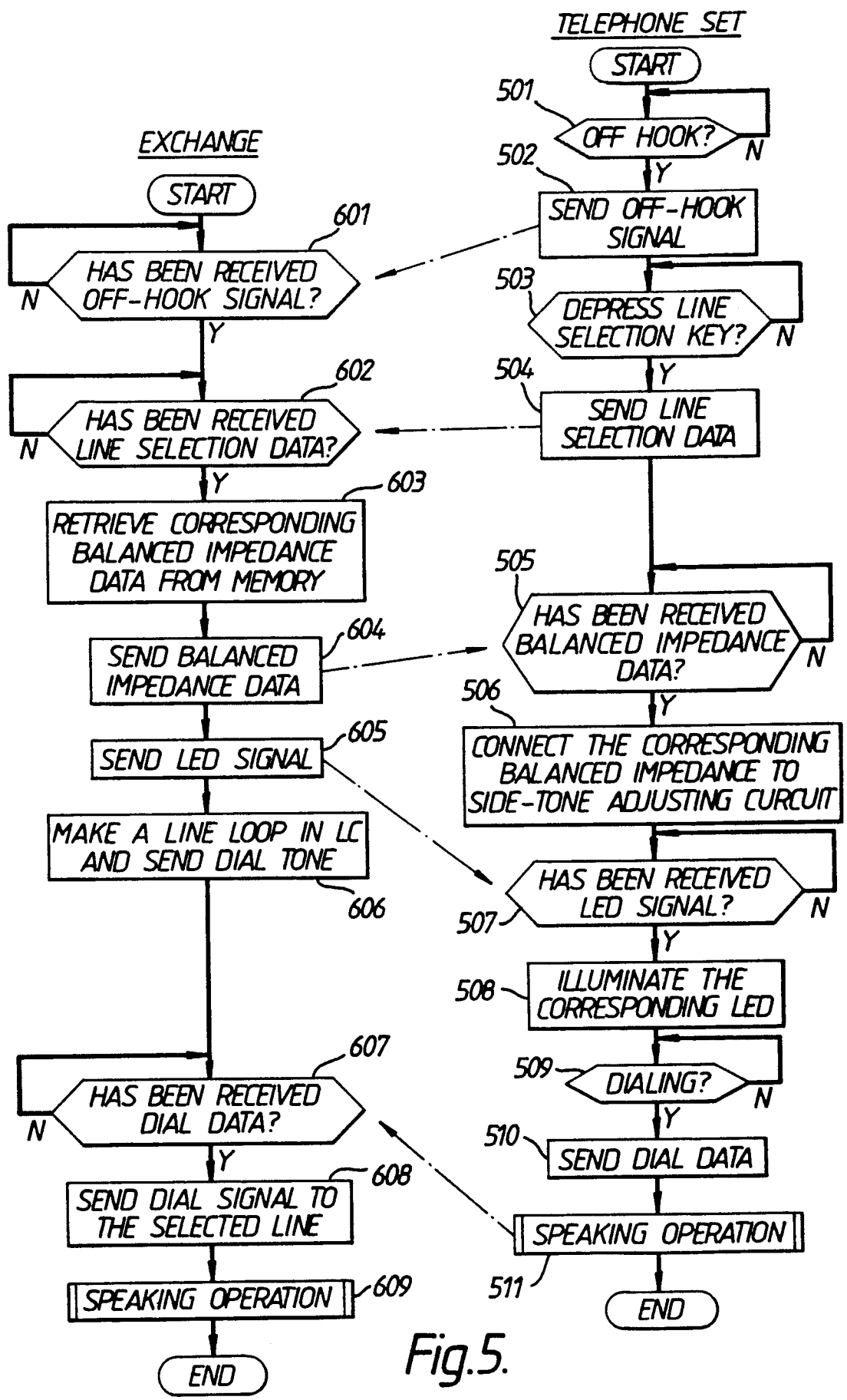
FIG. 5 is a flow chart showing a line selection process when a line selection is requested.

FIG. 5 describes the calling operation of both of control unit 9 and control circuit 103. When the handset including transmitter 113 and receiver 114 in EKT 10a is lifted due to a calling origination .control circuit 103 detects the manual operation and determines a off hook state, step 501. Control circuit 103 then sends off hook signal to control unit 9, step 502. When control unit 9 receives the off hook signal, step 601, it waits to receive line selection data. Thereafter, control circuit 103 sends line selection data indicating the line number when it detects the depression of the line selection key, steps 503 and 504. The line selection data is transmitted to control unit 9. Control unit 9 accesses memory block MB1 in response to the received data and retrieves balanced impedance data from memory block MB1, when control unit 9 receives the transmitted line selection data, steps 602 and 603. Control unit 9 then sends the retrieved balanced impedance data and a LED signal to control circuit 103, steps 604 and 605. Control unit 9 also causes trunk circuit 20a to make a line loop and causes a dial tone to send to EKT 10a from tone generator (not shown) through exchanging switch 6 and line circuit 3a, step 606, when the line selection data indicates office line 20a. Control circuit 103 generates a switch control signal indicating impedance circuit 117 when the balanced impedance data is received, steps 505 and 506. Switch 115 connects impedance circuit 117 to resistance 112 and receiver 114 in response to the switch control signal. Control circuit 103 also drives a LED corresponding to the depressed line selection key to illuminate, when it receives the LED signal, steps 508 and 509. Further, the calling operator hear the dial tone from receiver 114 since the transmitted dial tone is received by receiver 114. The operator confirms the connection between own telephone set 10a and the selected line 20a by the dial tone and the illumineted LED, and operates dial keys. Control circuit 103 sends dial data when it detects the dialling, steps 510 and 511. The dial data is received control unit 9. Control unit g responsive to the dial data sends dial signals to the selected line 20a from a dial signal generator (not shown) in trunk circuit 4a steps 607 and 608. Thereafter. both of exchange 1 and telephone set 10a establish speaking operations, steps 512 and 609. If the operator selects line 30a or the internal line, impedance circuit 116 is selected by the described-above operation.

In the preferred operation, the calling operation is described. However, the embodiment is adapted to a called operation in response to an extension call and the incaming call from lines 20a–20i and 30a–30j. In this operation, control unit 9 and control circuit 103 operates the line selection including impedance selection in much the same way as the above description.

Figure 6:
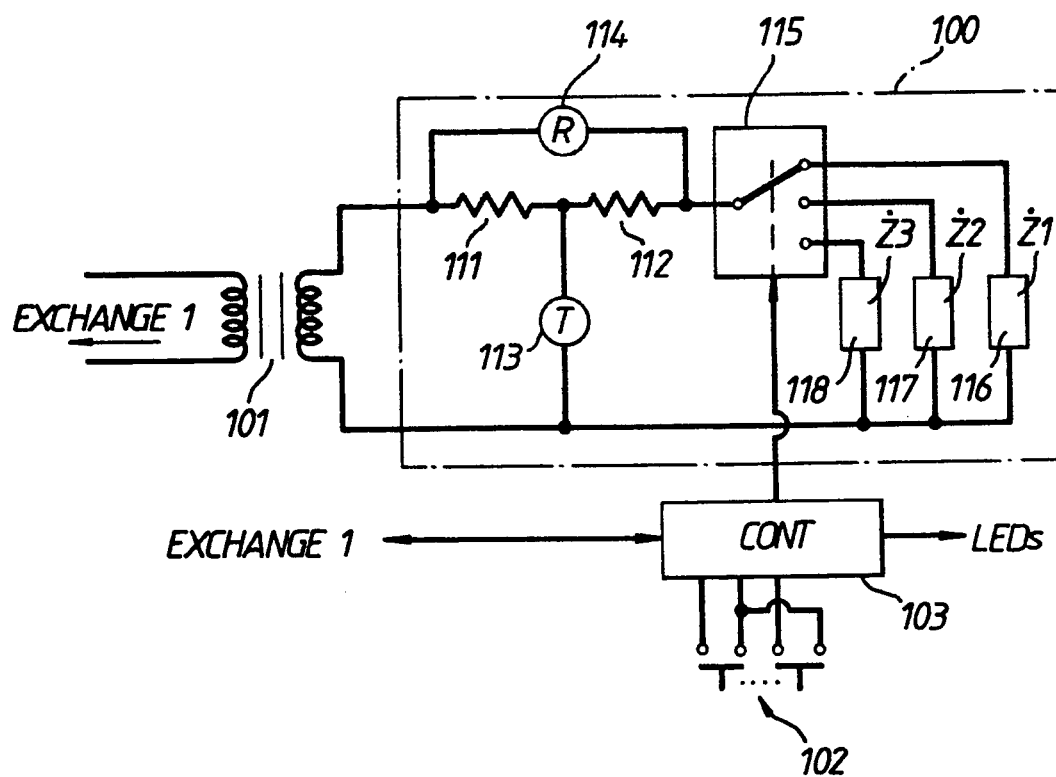
FIG. 6 is another block diagram of the telephone set.

FIG. 6 shows another embodiment of EKTs 10a–10n. The difference between this embodiment and the above embodiment is a number of the balanced impedance circuits. In this embodiment, side-tone adjusting circuit 100 further includes balanced impedance circuit 118.

Figures 7, 8:
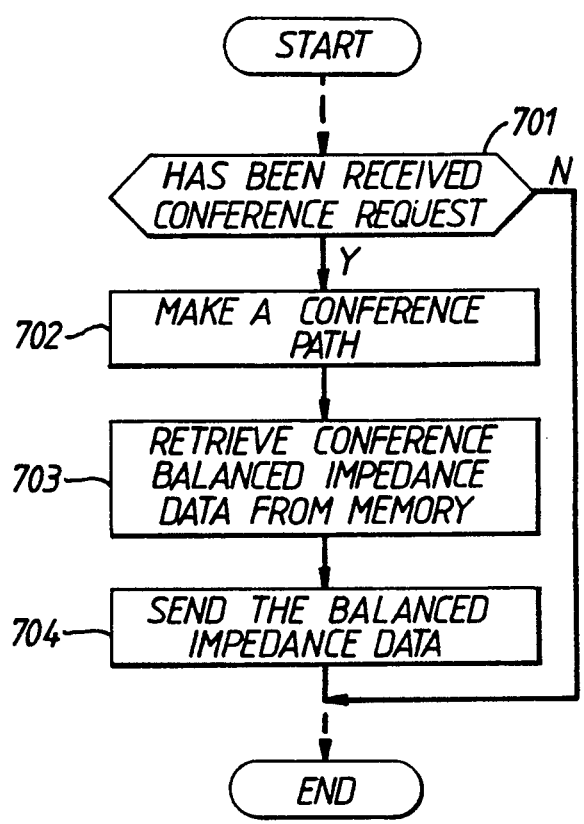
FIG. 7 is a flow chart showing a conference process when a conference selection is requested.
FIG. 8 shows a memory block of the memory device shown in FIG. 1 and the contents of the memory block.

The impedance value of impedance circuit 118 corresponds to an line impedance of a conference connection between one of office lines 20a-20i and two EKTs. This conference operation is described in FIG. 7.

When the operator of EKTs 10a depresses manual key 102 to establish the conference path after compleating a speaking path between EKTs 10b and office line 20a, control circuit 103 in EKT 10a sends conference request signal for the speaking path. Control unit 9 causes exchanging switch 6 to establish conference path between EKTs 10a and 10b and office line 20a in response to the request data, steps 701 and 702. Control circuit 9 also retrieves the balanced impedance data Z3 from memory block MB2 shown in FIG. 8 in memory device 7, step 703. The retrieved impedance data is sent to both of EKTs 10a and 10b, step 704. Each of control circuits 103 in EKTs 10a and 10b causes switch 115 to connect impedance circuit 118 to receiver 114 and resistance 112. Thus, the balanced impedance circuits are selected during a conference connection to obtain a suitable side-tone. Since the impedance of conference connection with office lines 20a-20i is changed by a branch connection to one office line, the quality of side-tone is debased if the balanced impedance circuit is not changed for the conference impedance circuit. In this embodiment, one conference impedance is prepared because the impedance of line 30a(-30j) is similar to the impedance of the internal line. However, when the number of conference EKTs increases i.e., control unit 9 and control circuit 103 may select a suitable one of a plural conference impedance circuits.

In the preferred embodiment, control circuit 103 selects one impedance circuit by the control of control unit 9. However, control circuit 103 may select one impedance circuit by itself after sending speaking path request, such as line selection request and conference request, to control unit 9. Further, in the preferred embodiment, control unit 9 needs the line selection request, including the line number data, from the EKT. However, the line number data is not necessary to control units 9 if control unit 9 determines one of the idle telephone lines by itself in response to the off hook data, excluding the line number data, from the EKT. While the invention has been described herein by reference to several preferred embodiments, various modifications can be made without departing from the true scope and spirit of the invention. It is our invention, therefore, by the appended claims, to embody all such modifications.

We claim:

1. A switching system having an exchange with an exchanging switch coupled to a plurality of telephone lines, a plurality of telephone sets coupled to said exchange, wherein said exchange, responsive to a line selection request from said telephone set, carries out a line selection to establish a communication path between said selected telephone line and said telephone set which requests the line selection, said switching system comprising:

means installed in said telephone set for generating the line selection request in response to a predetermined manual key operation;

memory means installed in said exchange for storing impedance information for said each telephone line or each group of said telephone lines;

means installed in said exchange for determining one of said impedance information stored in said memory means in response to the generated line selection request and for generating the determined impedance information;

means installed in said telephone set for selecting one of balanced impedances, corresponding to the generated impedance information, to obtain a suitable side-tone: and side-tone adjusting means in said telephone set for adjusting a side-tone in response to the selected balanced impedance.

2. The system of claim 1 wherein said side-tone adjusting means is a T-type bridge circuit: and said selecting means has a plurality of balanced impedances and selects one of them.

3. The system of claim 1 wherein said memory means have a memory block for retrieving impedance data by an access corresponding to a selection line number in the line selection request.

4. The system of claim 1 wherein said telephone lines are both of central office lines extending from a distant central office and external PBX's telephone lines extending from the near PBX.

5. The system of claim 4 wherein said balanced impedances correspond to the central lines and the external PBX's telephone lines respectively.

6. The system of claim 5 wherein said balanced impedance corresponding to the external PBX's telephone line is equal to a balanced impedance corresponding to extension telephone lines.

7. In a switching system having an exchange with an exchanging switch coupled to a plurality of telephone lines, a plurality of telephone sets coupled to said exchange, wherein said exchange, responsive to a line selection request from said telephone set, carries out a line selection by a line selection method, to establish a communication path between said selected telephone line and said telephone set which request the line selection, said line selection method comprising the steps of:

(a) storing impedance information for said each telephone line or each group of said telephone lines;

(b) generating the line selection request in response to a predetermined manual key operation;

(c) determining one of said stored impedance information in response to the generated line selection request and for generating the determined impedance information;

(d) selecting one of balanced impedances, corresponding to the generated impedance information, to obtain a suitable side-tone; and (e) adjusting a side-tone in response to the selected balanced impedance.

8. A switching system having an exchange with an exchanging switch coupled to a plurality of telephone lines, a plurality of telephone sets coupled to said exchange, wherein said exchange, responsive to a conference request from said telephone set, carries out a conference connection to establish communication paths between said selected telephone line and said telephone sets corresponding to the conference request, said switching system comprising:

means installed in said telephone set for generating the conference request in response to a predetermined manual key operation:

memory means installed in said exchange for storing a plurality of impedance information for the conference connection between said telephone line and said telephone sets and one communication connection between said telephone set and said telephone line or other telephone set;

means installed in said exchange for determining the conference impedance information stored in said memory means in response to the generated conference request and for generating the determined impedance information;

means installed in said telephone sets for selecting a balanced impedance, corresponding to the generated impedance information, to obtain a suitable side-tone; and side-tone adjusting means in said telephone sets for adjusting a side-tone in response to the selected balanced impedance.

9. The system of claim 8 wherein said side-tone adjusting means is a T-type bridge circuit; and said selecting means has a plurality of balanced impedances and selects one of them.

10. The system of claim 8 wherein said memory means have a memory block for retrieving impedance data by an access corresponding to the conference request from said telephone set.

11. The system of claim 8 wherein said determining means further determines an impedance information stored in said memory means, the impedance information corresponding to the one communication connection, when said determining means receives a request of the one communication connection from said telephone set; and selecting means further selects a balanced impedance, corresponding to the one communication connection, to obtain a suitable side-tone when the one communication connection is requested.

12. The system of claim 11 wherein said telephone lines are central office lines extending from a distant central office and external PBX's telephone lines extending from a near PBX;

said memory means further stores impedance information corresponding to the central office lines and external PBX's telephone lines respectively;

said determining means further determines whether the one communication connection uses the central office line or the external PBX's telephone line, and generates the impedance information corresponding to the determined line; and selecting means further selects a balanced impedance, corresponding to the generated impedance information.

13. The system of claim 12 wherein said balanced impedance corresponding to the external PBX's telephone line is equal to a balanced impedance corresponding to extension telephone lines.

14. In a switching system having an exchange with an exchanging switch coupled to a plurality of telephone lines, a plurality of telephone sets coupled to said exchange, wherein said exchange, responsive to a conference request from said telephone set, carries out a conference connection by a conference method, to establish communication paths between said selected telephone line and said telephone sets corresponding to the conference request, said conference method comprising the steps of:

(a) storing a plurality of impedance information for the conference connection between said telephone line and said telephone sets and one communication connection between said telephone set and said telephone line or other telephone set;

(b) generating the conference request in response to a predetermined manual key operation;

(c) determining said stored conference impedance information in response to the generated conference request and generating the determined impedance information:

(d) selecting a balanced impedance, corresponding to the generated impedance information, to obtain a suitable side-tone: and (e) adjusting a side-tone in response to the selected balanced impedance.

15. A switching system having an exchange with an exchanging switch coupled to a plurality of telephone lines, a plurality of telephone sets coupled to said exchange, wherein said exchange, responsive to a speaking path selection request from said telephone set, carries out a speaking path selection to establish a communication path between said telephone line and at least one telephone set, said switching system comprising:

means installed in said telephone set for generating the speaking path selection request in response to a predetermined manual key operation;

memory means for storing impedance information for said each kind of speaking path;

means for determining one of said impedance information stored in said memory means in response to the generated speaking path selection request and for generating the determined impedance information;

means for selecting one of balanced impedances, corresponding to the line impedance of said generated impedance information, to obtain a suitable side-tone: and side-tone adjusting means for adjusting a side-tone in response to the selected balanced impedance.

16. In a switching system having an exchange with an exchanging switch coupled to a plurality of telephone lines, a plurality of telephone sets coupled to said exchange, wherein said exchange, responsive to a speaking path selection request from said telephone set, carries out a speaking path selection by a method of a speaking path selection, to establish a communication path between said telephone line and at least one telephone set, said method comprising the steps of:

(a) storing impedance information for said each kind of speaking path;

(b) generating the speaking path selection request in response to a predetermined manual key operation at said telephone set;

(c) determining one of said stored impedance information in response to the generated speaking path selection request and generating the determined impedance information;

(d) selecting one of balanced impedances, corresponding to the line impedance of said generated impedance information, to obtain a suitable side-tone; and (e) adjusting a side-tone in response to the selected balanced impedance.

* * * * *